PERIODIC WAVEFORM GENERATOR

Filed Nov. 25, 1959

2 Sheets-Sheet 1

INVENTOR
F. D. Owen

BY
Sughrue, Rothwell, Mion & Zinn
ATTORNEYS

INVENTOR
F. D. Owen

BY Sughrue, Rothwell, Mion & Zinn
ATTORNEYS

United States Patent Office 3,210,558
Patented Oct. 5, 1965

3,210,558

PERIODIC WAVEFORM GENERATOR

Franklin D. Owen, Waverly, N.Y., assignor to International Business Machines Corporation, New York, N.Y., a corporation of New York Filed Nov. 25, 1959, Ser. No. 855,423
9 Claims. (Cl. 307—88.5)

My invention relates to function generators and more particularly to function generators which periodically produce an output of a desired waveform.

In many applications in the electronics art it is desirable to periodically produce a waveform which varies as a desired function of time. In certain radar display applications, for example, it is desirable to periodically produce a waveform which varies as a hyperbolic function of time. Such a waveform is used as a sweep voltage for a radarscope which requires a particular degree of compensation which is present in the hyperbolic waveform. In other applications it is desirable to produce a waveform which varies as a parabolic function of time or varies as the second power of time.

Most prior art function generators lack the versatility required to produce a large number of different waveforms. Further, the prior art function generators which are capable of producing more than one waveform are unduly complex. These function generators, for the most part, employ amplifiers which have attendant gain, band width and stability problems. These waveform generators have very slow recovery times which make them unsuitable for use in applications in which a fast repetition rate is required. In addition, attempts to transistorize such function generators have introduced serious temperature stability problems.

The present invention overcomes many of the disadvantages of prior art function generators by providing a charging capacitor which is charge from a transistor current source. The transistor current source can be modified so as to provide a number of different charging currents for the charging capacitor. These different charging currents each provide a different voltage waveform across the charging capacitor as it becomes charged.

Accordingly, it is an object of the present invention to provide a simple waveform generator which is capable of producing, with slight modifications, a large number of output waveforms.

It is a further object of the present invention to provide an improved waveform generator for use at high reptition rates.

It is a further object of the present invention to provide a transistorized waveform generator with improved temperature stability.

It is a further object of the present invention to provide an improved transistorized function generator for producing a hyperbolic sweep voltage for use in certain radar applications.

In accordance with one embodiment of my invention, I provide, in a function generator, a charging capacitor which is connected to be periodically charged from a summing transistor. This summing transistor is connected in a constant current configuration so that the current supplied to the charging capacitor is not dependent on the voltage on the charging capacitor. Provision is made for supplying a number of different currents to the summing transistor for periodically charging the charging capacitor. In one modification of the subject invention the current connected to the summing transistor is modified so as to vary linearly with time. A parabolic waveform is produced across the charging capacitor when such a modified current is applied to the charging capacitor through the summing transistor.

In another modification of the subject invention, a hyperbolic waveform is periodically produced across the charging capacitor by connecting a plurality of currents which vary exponentially with time to the summing transistor.

My invention will be better understood from the following description taking in connection with the accompanying drawings and its scope will be pointed out more particularly in the appended claims.

Figures 1, 2:
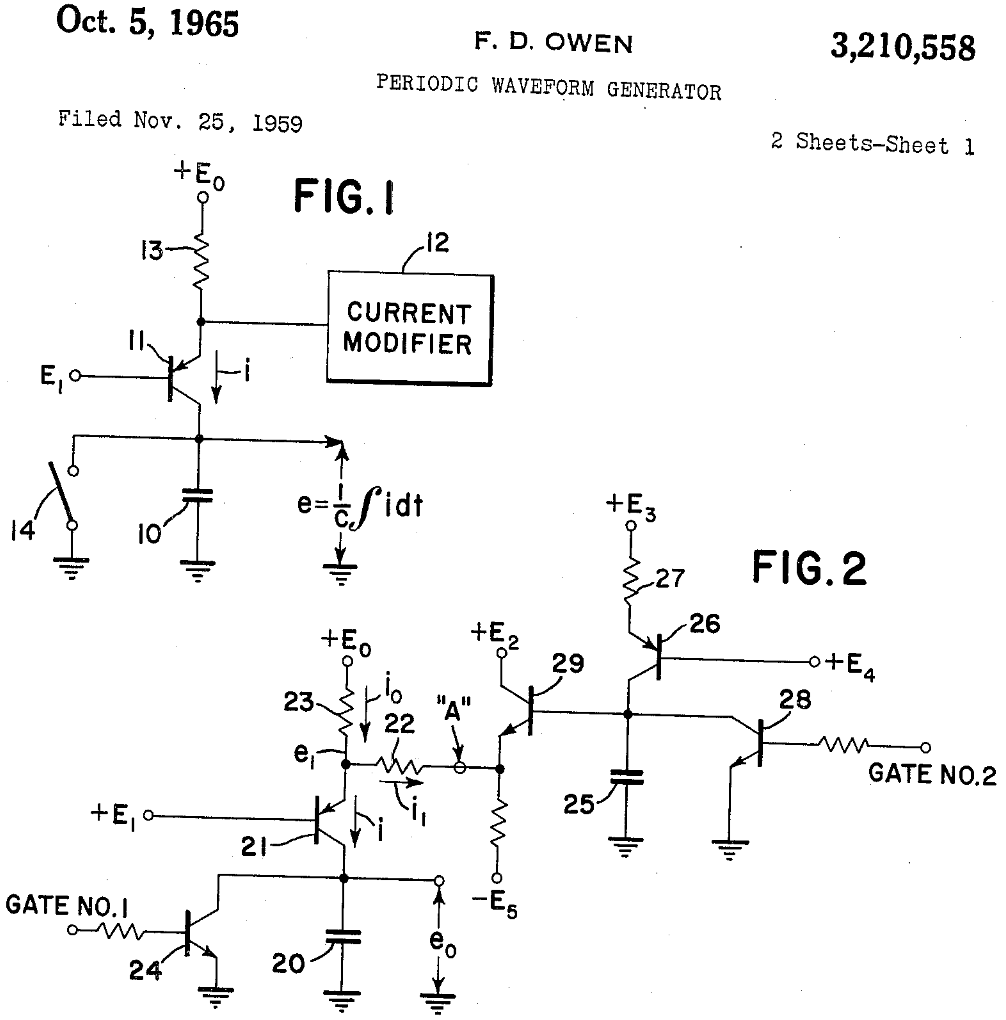
FIG. 1 is a diagram showing the board concept of my invention.
FIG. 2 is a schematic representation of a function generator which periodically produces a parabolic waveform.

FIGS. 3*a* through 3*c* show waveform diagrams depicting the operation of the circuit of FIG. 2.

Figure 4:
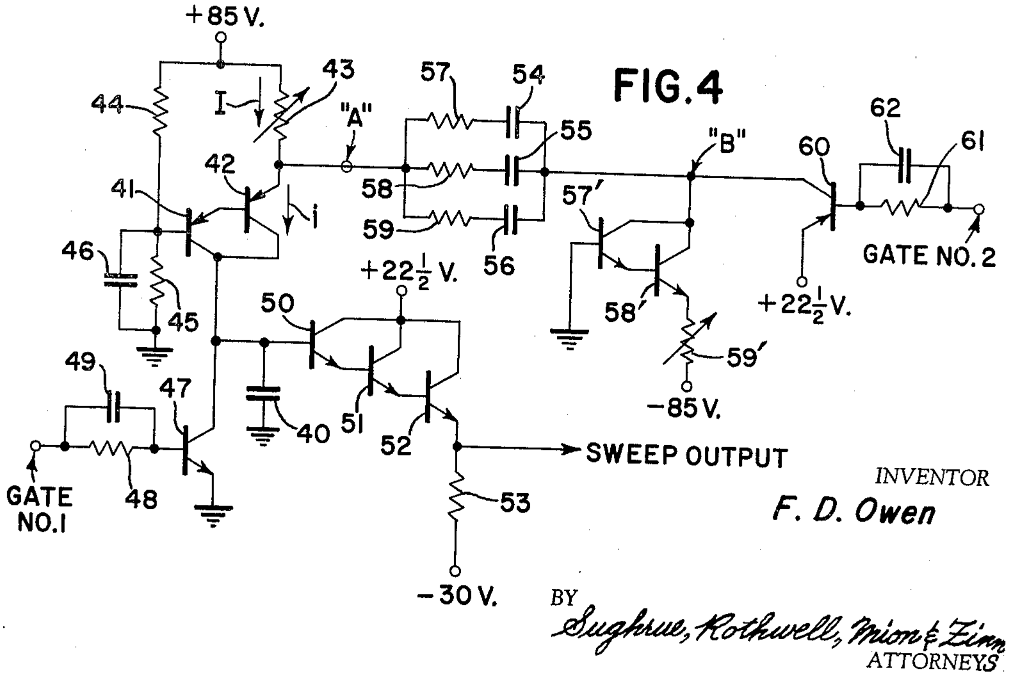

FIG. 4 is a schematic representation of a function generator of the subject invention which periodically produces a hyperbolic waveform.

FIGS. 5*a* through 5*c* show waveform diagrams depicting the operation of the circuit of FIG. 4.

Referring to FIG. 1 there is shown a charging capacitor 10 which is connected to be charged from a summing transistor 11. The current $i$, which flows from the emitter of transistor 11 through the base and collector to the charging capacitor 10, is determined by a current modifier shown in block form as 12. The emitter of transistor 11 is connected to the current modifier 12 and through a resistor 13 to a source of positive voltage $E_0$. In order to periodically charge and discharge the capacitor 10, a switch 14 is provided. This switch is connected across the charging capacitor 10 so that when the switch is closed, the charging capacitor 10 is shorted to ground potential. When the switch is open, the charging capacitor 10 is charged by the current $i$ through the summing transistor 11.

The operation of the general function generator of FIG. 1 is as follows: The switch 14 is periodically opened and closed so that the desired waveform appears across the charging capacitor 10 with the desired timing. With the switch 14 in the closed position, the charging capacitor 10 is shorted out, and the function generator is in the quiescent condition. Upon opening the switch 14, the current $i$ and the summing transistor 11 charges the charging capacitor 10. The resultant voltage across the charging capacitor 10 is given by the expression:

$$e_0=\frac{1}{C}\int idt \qquad (1)$$

where $e_0$ is the output voltage, C is the capacitance of charging capacitor 10, and $i$ is the current through the summing transistor 11. Thus, the output voltage $e_0$ can be made to assume any desired waveform by modifying the current $i$ which flows through the summing transistor 11.

It should be noted that because the summing transistor 11 is connected as a constant current device, the current $i$ will be dependent only upon the current modifier 12 and not upon the voltage on the charging capacitor 10. It can be shown that the equivalent circuit of a transistor connected in such a constant current configuration is a very large resistor returned to a very large voltage. That is, looking into the collector of transistor 11, impedance-wise, the circuit looks like a very large resistor returned to a very large voltage. The voltage on the collector of transistor 11 can, therefore, be changed appreciably without effectively changing the current through the transistor.

Referring to FIG. 2, there is shown one modification of the subject function generator which will periodically produce a parabolic waveform at the output. A charging capacitor 20 is connected to be charged from a summing transistor 21. The emitter of the summing transistor 21 is connected, through a resistor 22, to point A, which is, in turn, connected to a current modifier. The emitter of transistor 21 is also returned through a resistor 23 to a source of positive voltage $E_0$.

In order to periodically discharge the charging capacitor 20, a switching transistor 24 is connected across the charging capacitor 20. The switching transistor 24 is of the opposite conductivity type to the summing transistor 21 to give greater temperature stability. The change in $I_{c0}$ of one transistor tends to offset the change in $I_{c1}$ to the other transistor resulting in less change in charging current to the charging capacitor. The base of the switching transistor 24 is connected to a suitable gating voltage so that the switching transistor 24 is periodically switched between the conducting and the non-conducting states. When the switching transistor 24 is in the conducting state, the charging capacitor 20 is shorted to ground. When the switching transistor 24 is switched to the non-conducting state, the charging capacitor 20 will be charged from the summing transistor 21.

Referring to the current modifier which is connected to point A, there is shown a second charging capacitor 25 which is connected to be periodically charged from a second summing transistor 26 connected in a constant current configuration. The base of transistor 26 is connected to a source of positive biasing voltage $E_4$, and the emitter is returned through a resistor 27 to a source of positive voltage $E_3$. In order to periodically charge and discharge charging capacitor 25, a switching transistor 28 is connected across the charged capacitor 25. Again, the switching transistor is of the opposite conductivity type to the summing transistor for purpose of temperature stability. A suitable switching voltage is connected to the base of transistor 28 so as to switch the transistor between the conducting and the non-conducting states. This switching voltage, referred to as Gate No. 2, is the same gating voltage as that applied to the base of switching transistor 24. In a manner similar to the operation of switching transistor 24, the switching transistor 28 shorts the charging capacitor 25 to ground when the switching transistor 28 is in the conducting state. When the switching transistor 28 is switched to the non-conducting state, the charging capacitor 25 will be charged from the constant current source provided by the transistor 26. This charging produces a voltage across the charging capacitor 25 which varies linearly with time. The linear voltage across the charging capacitor 25 is connected through a transistor 29, connected in an emitter follower configuration, to the point A.

Figure 3:
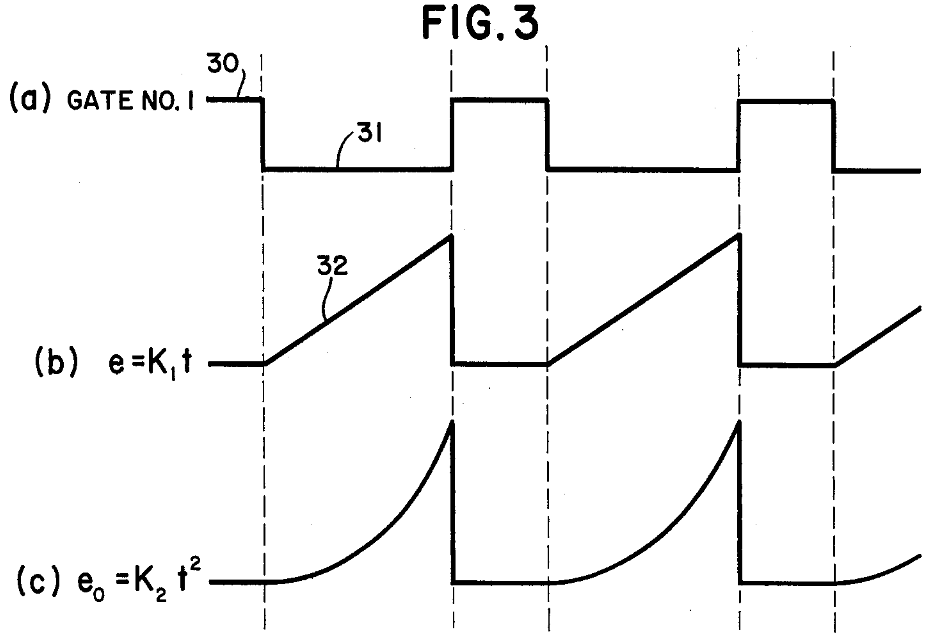

The operation of the circuit of FIG. 2 can best be explained by referring initially to the waveforms of FIG. 3, wherein FIG. 3*a* shows the waveform of Gate No. 1, FIG. 3*b* shows the waveform across the capacitor 25, designated *e* and FIG. 3*c* shows the waveform across the charging capacitor 20, designated $e_0$.

With Gate No. 1 at the positive level, designated 30 in FIG. 3*a*, the switching transistor 28 is conducting, and the second charging capacitor 25 is shorted to ground. Similarly, the first switching transistor 24 is conducting, and the charging capacitor 20 is shorted to ground. When gate No. 1 switches to the negative level, designated 31 in FIG. 3*a*, the switching transistors 24 and 28 are cut off and charging of the charging capacitors 20 and 25 begins. During the time interval in which Gate No. 1 is at the negative level, the voltage across the charging capacitor 25 will be a linear function of time, as shown at 32 in FIG. 3*b*. That is, because of charging from the constant current source of the transistor 26, the voltage across the charging capacitor 25 is given by the expression:

$$e=K_1t \qquad (2)$$

where $e$ is the voltage across the charging capacitor 25, $K_1$ is a constant dependent upon the parameters of the circuit, and $t$ is time. Because of the connection through the emitter follower transistor 29, this voltage will also appear at the point A.

Because the voltage at the point A varies linearly with time during the period that the Gate No. 1 is in the negative condition, the current $i$, through the summing transistor 21, will also vary linearly with time during this interval. Because the linearly varying current $i$ is used to charge the charging capacitor 20, the voltage across the capacitor varies parabolically with time. That is, during the time interval in which the Gate No. 1 is at the negative condition, the voltage across the charging capacitor 20 is given by the expression:

$$e_0=K_2t^2 \qquad (3)$$

where $e_0$ is the voltage across charging capacitor 20, $K_2$ is the constant dependent upon the parameters of these circuits, and $t$ is time.

That the voltage across the capacitor 20 is in fact a parabolic function of time can best be shown mathematically. For this purpose, currents, voltages and resistances in the circuit are designated as follows:

$i$=current through transistor 21
$i_0$=current through resistor 23
$i_1$=current through resistor 22
$E_0$=voltage at one end of resistor 23
$e$=voltage at point "$A$"$=K_1t$
$e_1$=voltage at emitter of transistor 21
$R_{22}$=resistance of resistor 22
$R_{23}$=resistance of resistor 23

First defining the current though resistor 22 we see that:

$$i_1=\frac{e_1-e}{R_{22}}=\frac{e_1-K_1t}{R_{22}} \qquad (4)$$

Now defining the current through the resistor 23 we see that:

$$i_0=\frac{E_0-e_1}{R_{23}} \qquad (5)$$

Therefore, the current through transistor 21 is given by:

$$i=i_0-i_1=\frac{E_0-e_1}{R_{23}}-\frac{e_1-K_1t}{R_{22}} \qquad (6)$$

We will assume at time equals 0, $t=0$, the quiescent level of point A is zero volts and that $R_{22}$ could be adjusted so that $i$ is equal to zero. Expressing this in terms of Equation 6 we see that:

$$i=\frac{E_0-e_1}{R_{23}}-\frac{e_1-K_1t=0}{R_{22}} \qquad (7)$$

Or a time $t=0$, $$\frac{E_0-e_1}{R_{23}}=\frac{e_1}{R_{22}} \qquad (8)$$

Or, $$E_0-e_1=e\frac{R_{23}}{1R_{22}} \qquad (9)$$

Refering back to Equation 1, it will be recalled that the output voltage which appears across the charging capacitor is given by:

$$e_0=\frac{1}{C}\int idt \qquad (1)$$

Inserting the expression for the current $i$, Equation 6, into this equation we see that:

$$e_0=\frac{1}{C}\int\frac{E_0-e_1}{R_{23}}dt-\frac{1}{C}\int\frac{e_1-K_1t}{R_{22}}dt \qquad (10)$$

Inserting Equation 8 into this expression we see that:

$$e_0=\frac{1}{C}\int\frac{e_1}{R_{22}}dt-\frac{1}{C}\int\frac{e_1-K_1t}{R_{22}}dt \qquad (11)$$

Peforming the integrations we see that:

$$e_0=\frac{e_1}{2R_{22}C}t-\frac{e_1}{2R_{22}C}t+\frac{K_1t^2}{2R_{22}C} \qquad (12)$$

Or, $$e_0=K_2t^2 \qquad (13)$$

That is, the output voltage $e_0$, varies as the second power of time. This is a parabolic waveform.

By extending the above concept, the square waveform could be fed into a similar circuit with the result that the output will vary as the third power of time. Similarly, this output could be fed into any number of similar circuits to produce an output whose waveform varied as the desired power of time.

Now referring to the circuit of FIG. 4, there is shown a function generator which will produce an output which varies hyperbolically with time. In this circuit there is shown a charging capacitor 40 which is connected to be charged from the summing transistors 41 and 42. These two compound-connected transistors replace the single summing transistor 21 of FIG. 2. This compound connection is employed in place of a single transistor merely to obtain very high alphas and thus reduce the base current of transistor 41. This is quite desirable when transistors are connected in a constant current configuration, and such a configuration could be used advantageously in the circuit of FIG. 2.

The emitter of transistor 42 is connected to point A and is also connected through a resistance 43 to a positive voltage which, by way of example, is shown as being +85 volts. In order to provide the proper bias for the summing transistors 41 and 42, the base of transistor 41 is connected through a resistor 44 to +85 volts and through a resistor 45 to ground potential. The resistance 45 is by-passed to ground by a capacitor 46.

In order to periodically charge and discharge the charging capacitor 40, a switching transistor 47 is connected to be switched between the conducting and the non-conducting states by Gate No. 1. Gate No. 1 is applied to the base of transistor 47 through a resistor 48 which is by-passed by a capacitor 49.

The voltage across the charging capacitor 40 is connected to the sweep output through a compound emitter follower made up of the transistors 50, 51 and 52. The collectors of these transistors are connected to a source of positive voltage which, by way of example, is shown as being +22½ volts. The emitter of transistor 52 is returned through a resistor 53 to −30 volts. The sweep output is taken across the resistor 53.

The current modifier connected to point A includes a plurality, in this Example 3, of parallel connected compensation network capacitors 54, 55 and 56. These charging capacitors are connected through the resistors 57, 58 and 59 to point A. The other sides of these capacitors are connected together and thence connected to the constant current source supply made up of the transistors 57 and 58. The base of transistor 57 is connected to ground, and the emitter of transistor 58 is connected through a variable resistor 59 to a source of negative voltage, in this case, −85 volts.

In order to periodically charge and discharge the compensation network capacitors 54, 55 and 56, a switching transistor 60 is provided. Gate No. 2 is connected through a resistor 61 to the base of switching transistor 60 so as to switch this transistor between the conducting and non-conducting states. The resistor 61 is by-passed by a capacitor 62 for speed up.

Figure 5:
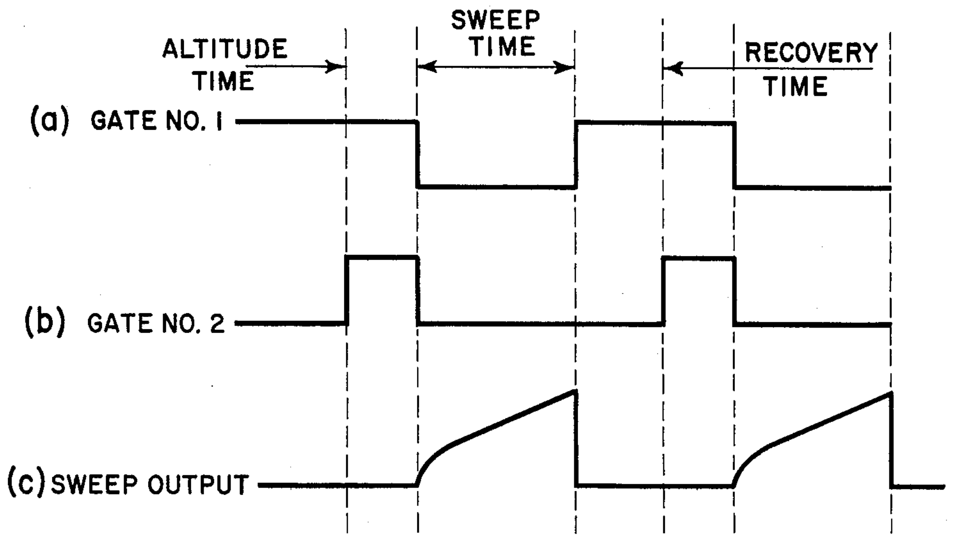

The operation of the circuit of FIG. 4 can best be described by referring initially to the waveforms of FIG. 5, wherein FIG. *5a* shows the waveform of Gate No. 1, FIG. *5b* shows the waveform of Gate No. 2, and FIG. *5c* shows the waveform of the sweep output. These waveforms have been divided into three distinct time periods; recovery time, altitude time and sweep time.

Very briefly, the operation of the function generator during these three intervals is: during recovery time the charging capacitor 40 and the compensation network capacitors 54, 55 and 56 reach a steady state; during altitude time the altitude compensation capacitors 54, 55, and 56 are charged; during sweep time the capacitors 54, 55 and 56 are discharged through summing transistors 41 and 42. These exponential discharge currents together with the constant current through resistor 43 are summed in the summing transistors 41 and 42 and used to charge the capacitor 40 during sweep time.

In more detail, during recovery time Gate No. 1 is at a positive level, thus turning on the transistor 47. Thus, the charging capacitor 40 is shorted to ground. During recovery time Gate No. 2 is negative, thus turning on transistor 60. Point B, at the collector of switching transistor 60, is held at +22½ volts. During this time, the capacitors 54, 55 and 56 gain some quiescent charges dependent on the voltage difference between points A and B. The recovery time must be of sufficient length for the charging capacitor 40 and the compensation network capacitors 54, 55 and 56 to reach a steady state.

At the beginning of altitude time, switching transistor 60 is cut off by gate No. 2. With switching transistor 60 conducting, there is normally current flow from +22½ volts through transistor 60, through transistors 57 and 58 and resistor 59 to −85 volts. Because transistors 57 and 58 are connected in a constant current configuration, this current flow tends to be invariant. When, at the beginning of altitude time, gate No. 2 cuts off switching transistor 60, there is a tendency for current to flow from +85 volts through resistor 43 and through the altitude compensation network to the constant current source made up of the transistor 57 and 58. This current charges compensation network capacitors 54, 55, and 56 during altitude time.

At the beginning of the sweep time, Gate No. 2 goes negative, thus turning switching transistor 60 on and Gate No. 1 goes negative, thus cutting switching transistor 47 off. Each of the altitude compensation capacitors 54, 55 and 56 will now be discharged with current flow through point A and summing transistors 41 and 42. These exponential discharge currents are added to the current I which flows through resistor 43, in the summing transistors 41 and 42.

Thus, during sweep time the charging capacitor 40 is charged by current from summing transistors 41 and 42. The expression for this current is:

$$i=I+K_1e^{-\frac{t}{R_{57}C_{54}}}+K_2e^{-\frac{t}{R_{58}C_{55}}}+K_3e^{-\frac{t}{R_{59}C_{56}}} \qquad (14)$$

where $i$ is the current flow in the summing transistors 41 and 42; I is the constant current through resistor 43; $K_1$, $K_2$ and $K_3$ are constants dependent upon parameters of these circuits; $R_{57}$, $R_{58}$ and $R_{59}$ are the resistances of resistors 57, 58, 59, respectively; and $C_{54}$, $C_{55}$, $C_{56}$ are the capacitances of capacitors 54, 55 and 56, respectively. I have found, and it can be shown mathematically, that when such a current is used to charge the capacitor 40, the voltage across the capacitor has a hyperbolic waveform. This hyperbolic waveform is connected through the compound emitter follower made up of the transistors 50, 51 and 52 to the sweep output.

In a practical embodiment, I have found that the following components may be used advantageously in the circuit of FIG. 4. These compenents are given merely by way of example and are not in any way intended to limit the scope of the invention.

| | |
|---|---|
| Resistor **44** | 15K ohms. |
| Resistor **45** | 5.1K ohms. |
| Resistor **48** | 20K ohms. |
| Resistor **53** | 2K ohms. |
| Resistor **61** | 5.1K ohms. |
| Capacitor **40** | .066 microfarads. |
| Capacitor **46** | 10 microfarads. |
| Capacitor **49** | 3600 micro-microfarads. |
| Capacitor **62** | 200 micro-microfarads. |
| Transistor **41** | 2N495. |
| Transistor **42** | 2N495. |
| Transistor **47** | 2N657. |

| | |
|---|---|
| Transistor 50 | 2N338. |
| Transistor 51 | 2N338. |
| Transistor 52 | 2N657. |
| Transistor 57 | 2N338. |
| Transistor 58 | 2N343. |

The values of resistors 43, 57, 58, 59 and capacitors 54, 55 and 56 are dependent upon system requirements.

The advantages of simplicity and versatility of the above circuits over the function generators of the prior art are obvious from the above description. Moreover, in addition to these important advantages, the circuits described above have the further advantage that they do not employ amplifiers, and hence, the circuits do not suffer from gain, band width and stability problems. The circuits described above also have an exceedingly fast recovery time. The recovery time is limited only by the length of time required for a transistor switch to discharge a capacitor. This permits the use of these circuits in a wide variety of applications where exceedingly fast repetitions of the waveform are required. It should also be noted that in all of the above circuits, the switching transistors are of the opposite conductivity type of the summing transistors. Such an arrangement gives excellent temperature stability, because the change in $I_{C0}$ of one transistor tends to offset the change in the other, resulting in less change of the charging current into the charging capacitors.

While certain specific embodiments of my invention have been shown and described, it will, of course, be understood that various other modifications may be made without departing from the principles of the invention. The appended claims are therefore intended to cover any such modifications within the true spirit and scope of the invention.

What I claim as new and desire to secure by Letters Patent of the United States is:

1. An electronic apparatus for periodically producing a desired waveform comprising:
   (a) a variable, periodic charging current source having an output,
   (b) an active element device having an input and an output and connected in a unity current gain configuration such that the current produced at the output of said device is substantially independent of the voltage or impedance connected to said output,
   (c) means connecting the output of the variable charging current source to the input of the active element device,
   (d) a charging capacitor having an input terminal, and
   (e) means connecting the output of the active element device to the input terminal of the charging capacitor, whereby the periodic charging voltage on the charging capacitor is the desired waveform.

2. Electronic apparatus for periodically producing a desired waveform comprising; means for producing a plurality of charging currents, a summing transistor having an input electrode, an output electrode and a control electrode, means for connecting said plurality of charging currents to the input electrode of said summing transistor, a charging capacitor, the output electrode of said summing transistor being connected to said charging capacitor so that said plurality of charging currents are simultaneously fed to said charging capacitor, and means connected to said charging capacitor for periodically discharging same, whereby the periodic charging voltage on said charging capacitor is the desired waveform.

3. Electronic apparatus for periodically producing a desired waveform comprising; means for producing a plurality of charging currents, a summing transistor having emitter, base and collector electrodes, said last named means being connected to said emitter electrode, said emitter electrode and said base electrode being returned to different biasing potentials so as to bias said summing transistor in a constant current made of operation, a charging capacitor, the collector of said summing transistor being connected to said charging capacitor, and means connected to said charging capacitor for periodically discharging same, whereby the periodic charging voltage on said charging capacitor is the desired waveform.

4. Electronic apparatus for periodically producing a parabolic waveform comprising; means for periodically producing a charging current which varies as a linear function of time, a summing transistor having an input electrode, an output electrode and a control electrode, means for feeding said charging current to the input electrode of said summing transistor, a charging capacitor, the output electrode of said summing transistor being connected to said charging capacitor so that said charging current is fed periodically to said charging capacitor, and means connected to said charging capacitor for periodically discharging same, whereby the periodic charging voltage on said charging capacitor is the desired waveform.

5. Electronic apparatus for periodically producing a parabolic waveform comprising; means for producing a constant current, a first charging capacitor, said constant current producing means being connected to said first charging capacitor whereby the voltage on said first charging capacitor varies as a linear function of time, means connected to said first charging capacitor for producing a linearly varying charging current, a summing transistor having an input electrode, an output electrode and a control electrode, means for feeding said linearly varying charging current to the input electrode of said summing transistor, a second charging capacitor, the output electrode of said summing transistor being connected to said second charging capacitor so that said linearly varying charging current is fed to said second charging capacitor, and means for periodically discharging said second charging capacitor, whereby the periodic charging voltage on said second charging capacitor is the desired parabolic waveform.

6. Electronic apparatus for periodically producing a parabolic waveform comprising; a charging transistor, said charging transistor being biased in a constant current configuration, a first charging capacitor, said charging transistor being connected to said first charging capacitor so that said first charging capacitor is charged from a constant current source, a first switching transistor, said first switching transistor being switched between the conducting and non-conducting states by a suitable periodic switching potential, the constant current from said charging transistor charging said first charging capacitor linearly when said first switching transistor is in the non-conducting state, means connected to said first charging capacitor for producing a linearly varying charging current, a summing transistor having an input electrode, an output electrode and a control electrode, said linearly varying charging current producing means being connected to the input electrode of said summing transistor, a second charging capacitor, the output electrode of said summing transistor being connected to said second charging capacitor so that said linearly varying charging current is fed to said second charging capacitor, a second switching transistor connected across said second charging capacitor, said second switching transistor being switched between the conducting and non-conducting states by a periodic gating voltage, whereby the voltage on said second charging capacitor is the desired parabolic waveform when said second switching transistor is in the non-conducting state.

7. Electronic apparatus for periodically producing a hyperbolic waveform comprising; means for producing a plurality of exponential charging currents which vary exponentially with time, unity current gain means for producing a charging current, a charging capacitor, and means for periodically applying said plurality of exponential charging currents through said unity current gain means to said charging capacitor, whereby the voltage on said charging capacitor is of a periodically recurring hyperbolic waveform.

8. Electronic apparatus for periodically producing a hyperbolic waveform comprising; a plurality of compensation network capacitors connected in parallel, means for producing a first constant charging current, means for periodically applying said first constant charging current to said plurality of compensation network capacitors, means for periodically discharging each of said compensation network capacitors to produce a plurality of charging currents which vary exponentially with time, means for producing a second constant charging current, a charging capacitor, and means for periodically applying said plurality of exponential charging currents and said constant charging current to said charging capacitor, whereby the voltage on said charging capacitor is of a periodically recurring hyperbolic waveform.

9. Electronic apparatus for periodically producing a hyperbolic waveform comprising; a plurality of compensation network capacitors connected in parallel, a first transistor and a second transistor compound-connected in a constant current configuration, said first and said second transistors being connected to provide a constant charging current to said plurality of compensation network capacitors, a first switching transistor, said first switching transistor being connected to be switched between the conducting and non-conducting states by a first periodic switching voltage, said plurality of compensation network capacitors being charged from said first and second transistors when said first switching transistor is in the non-conducting state, said plurality of compensation network capacitors being periodically discharged to provide a plurality of charging currents which vary exponentially with time, a fourth transistor and a fifth transistor compound-connected to form a current summing device, said plurality of compensation network capacitors being connected to said current summing device, means for producing a second, linear, constant charging current, a charging capacitor, said current summing device being connected to said charging capacitor so that said plurality of exponentially varying charging currents and said second, linear constant charging current are connected to said charging capacitor, a second switching transistor, said second switching transistor being connected to be switched between the conducting and non-conducting states by a second periodic switching voltage, said charging capacitor being charged by the current from said summing device when said second switching transistor is in the non-conducting state, whereby a hyperbolic voltage waveform is periodically produced across said charging capacitor, and emitter follower means for connecting the voltage across said charging capacitor to the output of said electronic apparatus.

References Cited by the Examiner

UNITED STATES PATENTS

| | | | |
|---|---|---|---|
| 2,489,312 | 11/49 | Pacini | 328—183 |
| 2,554,172 | 5/51 | Custin | 328—183 |
| 2,555,837 | 6/51 | Williams | 328—127 |
| 2,621,292 | 12/52 | White | 328—127 |
| 2,663,800 | 12/53 | Herzog | 307—88.5 |
| 2,735,007 | 2/56 | McCurdy | 328—127 |
| 2,769,904 | 11/56 | Ropiequet | 328—183 |
| 2,872,571 | 2/59 | Lenz | 328—128 |
| 2,924,744 | 2/60 | Paynter | 307—88.5 |
| 2,965,770 | 12/60 | Lewinter | 307—88.5 |
| 2,986,704 | 5/61 | Lichtenstein | 328—142 |
| 3,011,068 | 11/61 | McVey | 328—183 |

FOREIGN PATENTS 557,744 5/58 Canada.

OTHER REFERENCES

Waveforms, Radiation Laboratory Series, volume 19, McGraw-Hill, 1949, pages 301 to 312.

ARTHUR GAUSS, *Primary Examiner.*

HERMAN KARL SAALBACH, GEORGE N. WESTBY, *Examiners.*